US011599092B2

(12) United States Patent
Stanger

(10) Patent No.: US 11,599,092 B2
(45) Date of Patent: Mar. 7, 2023

(54) CONSTRUCTION MACHINE, IN PARTICULAR A CRANE, AND METHOD FOR THE CONTROL THEREOF

(71) Applicant: Liebherr-Werk Biberach GmbH, Biberach an der Riss (DE)

(72) Inventor: Norbert Stanger, Attenweiler (DE)

(73) Assignee: Liebherr-Components Biberach GmbH, Biberach an der Riß (DE)

( * ) Notice: Subject to any disclaimer, the term of this patent is extended or adjusted under 35 U.S.C. 154(b) by 24 days.

(21) Appl. No.: 17/473,084

(22) Filed: Sep. 13, 2021

(65) Prior Publication Data

US 2021/0405619 A1 Dec. 30, 2021

Related U.S. Application Data

(63) Continuation of application No. 16/091,992, filed as application No. PCT/EP2017/000449 on Apr. 7, 2017, now Pat. No. 11,119,467.

(30) Foreign Application Priority Data

Apr. 8, 2016 (DE) ..................... 10 2016 004 266.4

(51) Int. Cl.
*G05B 19/4155* (2006.01)
*B66C 13/18* (2006.01)
(Continued)

(52) U.S. Cl.
CPC .......... *G05B 19/4155* (2013.01); *B66C 13/18* (2013.01); *B66C 13/46* (2013.01);
(Continued)

(58) Field of Classification Search
CPC ...... G05B 19/4155; G05B 2219/34205; B66C 13/46; B66C 13/68; B66C 15/04;
(Continued)

(56) References Cited

U.S. PATENT DOCUMENTS 6,845,311 B1  1/2005  Stratton et al.
9,688,518 B2  6/2017  Delplace
(Continued)

FOREIGN PATENT DOCUMENTS

DE   19825312 B4   3/1999
DE   10224312 A1  12/2004
(Continued)

OTHER PUBLICATIONS

International Search Report and Written Opinion for Related International Application No. PCT/EP2017/000449 dated Nov. 7, 2017, 37 pages.
(Continued)

*Primary Examiner* — Marthe Y Marc-Coleman
(74) *Attorney, Agent, or Firm* — Troutman Pepper Hamilton Sanders LLP; Ryan A. Schneider

(57) ABSTRACT

A construction machine, in particular in the form of a crane such as a revolving tower crane, having a control apparatus for controlling at least one piece of work equipment of the construction machine using a structure data model that includes digital information on a structure to be erected and/or to be worked. A method of controlling such a construction machine with the aid of digital data from such a structure data model. The construction machine has a data exchange module connectable to the master construction site computer for the exchange of digital data with a master construction site computer, with the data exchange module having reading and/or writing means for reading and/or writing access to the master construction site computer. The construction machine carries out at least individual work steps such as the traveling of a construction element in automated manner using digital data from the master construction site computer. A control module that can be positioned at the load suspension means and/or at the construc- (Continued)

tion element to be traveled and that can be configured as a wearable, in particular in the form of gloves having integrated movement control sensors is provided for the fine positioning.

19 Claims, 4 Drawing Sheets

(51) Int. Cl.
 *B66C 13/46* (2006.01)
 *B66C 15/04* (2006.01)
(52) U.S. Cl.
 CPC ......... *B66C 15/04* (2013.01); *B60W 2300/16* (2013.01); *G05B 2219/34205* (2013.01)
(58) Field of Classification Search
 CPC .. B66C 13/48; B66C 15/045; B60W 2300/16; E02F 9/262; E02F 9/24; E02F 9/265
 See application file for complete search history.

(56) References Cited

U.S. PATENT DOCUMENTS

| | | | |
|---|---|---|---|
| 2002/0178830 A1 | 12/2002 | Kazerooni et al. | |
| 2007/0050137 A1 | 3/2007 | Woon et al. | |
| 2010/0070179 A1 | 3/2010 | Cameron | |
| 2011/0029098 A1 | 2/2011 | Fukuda et al. | |
| 2013/0013251 A1* | 1/2013 | Schoonmaker | B66C 15/04 |
| | | | 702/152 |
| 2013/0299440 A1 | 11/2013 | Hermann et al. | |
| 2013/0345857 A1 | 12/2013 | Lee et al. | |
| 2014/0168266 A1 | 6/2014 | Kimura | |
| 2014/0218233 A1 | 8/2014 | Cameron et al. | |
| 2016/0034730 A1 | 2/2016 | Delplace | |
| 2016/0035120 A1 | 2/2016 | Delplace | |
| 2016/0035251 A1 | 2/2016 | Delplace | |
| 2016/0107866 A1* | 4/2016 | Schoonmaker | B66C 13/46 |
| | | | 701/50 |
| 2016/0185574 A1 | 6/2016 | Enomoto et al. | |

FOREIGN PATENT DOCUMENTS

| | | |
|---|---|---|
| DE | 102011002952 A1 | 7/2012 |
| EP | 3037376 A1 | 6/2016 |
| JP | H07061800 A | 3/1995 |
| RU | 58111 U1 | 11/2006 |
| RU | 157928 U1 | 12/2015 |
| WO | 1997045359 A1 | 12/1997 |
| WO | 2013006625 A2 | 1/2013 |

OTHER PUBLICATIONS

Search Report for German Application No. 10 2016 004 266.4, dated Feb. 3, 2017, 10 pages.
Zhang, Cheng et al., "Improving Lifting Motion Planning and Re-Planning of Cranes With Consideration for Safety and Efficiency," Advanced Engineering Informatics, 26, 2012, pp. 396-410.
Zhang, Cheng, "Improving Crane Safety by Agent-Based Dynamic Motion Planning Using UWB Real-Time Location," Thesis in the Department of Building, Civil and Environmental Engineering, Nov. 2010, 225 pages.
International Preliminary Report on Patentability for International Application No. PCT/EP2017/000449 dated Oct. 9, 2018, 26 pages.
Search Report from Russian Application No. 2018139154/03 dated Jun. 9, 2020 (7 pages).
Mohamed Marzouk, Ahmed Abubakr "Decision support for tower crane selection with building information models and genetic algorithms", Automation in Construction, vol. 61, pp. 1-15 (2015).

* cited by examiner

US 11,599,092 B2

CONSTRUCTION MACHINE, IN PARTICULAR A CRANE, AND METHOD FOR THE CONTROL THEREOF

CROSS-REFERENCE TO RELATED APPLICATIONS

This application is a continuation of U.S. patent application Ser. No. 16/091,992 filed 7 Oct. 2018, which is a § 371 national stage of International Application PCT/EP2017/000449, with an international filing date of 7 Apr. 2017, which International Application claims the benefit of DE Patent Application Serial No. 10 2016 004 266.4, filed on 8 Apr. 2016, the benefit of the earlier filing date of which is hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to a construction machine, in particular in the form of a crane such as a revolving tower crane, having a control apparatus for controlling at least one piece of work equipment of the construction machine using a structure data model that includes digital information on a structure to be erected and/or to be worked. The invention further relates to a method of controlling such a construction machine with the aid of digital data from such a structure data model.

2. Description of Related Art

The planning of the crane deployment on construction sites typically takes place by the work preparation of the participating construction company or in detail by the foremen on site. The bases for the planning are here the work plans that are typically still two-dimensional, occasionally also already three-dimensional; furthermore the timetables; and in part the cost plan of the construction project. Since the work plans are usually specific to the trade, the final monitoring of the freedom from collision of the crane is only possible on the execution. Time displacements of individual work and plan changes are often not subsequently entered into the documents in time.

More recently, digital structure data models have also been used for the planning, erecting, working, and checking of structures that are occasionally called BIMs (building information models) and that include digital information on the structure to be erected or worked, with it in particular being a total model here that as a rule includes the three-dimensional plans of all trades, the timetable, and also the cost plan. Such structure data models or BIMs are as rule computer readable files or file conglomerates and occasionally processing computer program modules for processing such files in which information and characteristics describe the structure to be erected or to be worked and its relevant properties in the form of digital data.

In general, such structure data models can include two-dimensional, three-dimensional, or multi-dimensional CAD data for the visualization of the structure and/or its structure parts, but also other relevant information on the structure, for example its timetable for its erection, the cost plant, information on the surrounding infrastructure such as access roads, energy and water utilities, or logistical information on required auxiliary material for the erection or working of the structure. Structure parameters such as construction volume, structure height, dimensions of extent in elevation and on the ground plan, material volumes such as the required volume of concrete, volume of bricks, et cetera. or construction element weights of individual structure components such as steel beams, fabricated construction elements, or similar are often included as characteristic structure data. The structure data model and its files or the file conglomerate is here frequently sendable and/or has network capability to be provided to different construction participants.

A number of processes in the erection of a structure are processed with the aid of a computer with the aid of such structure data models, with an architect preparing a draft in classical construction planning, for example, and drawing it with the aid of CAD systems, whereupon a quantity determination can be prepared for the cost calculation on the basis of the CAD drawings, or the plans can be submitted to other professional engineers, fire safety inspectors, or authorities. If plan changes occur, the drawings are changed and coordinated with the participants, with the quantity determination being adapted and the cost calculation being revised, which makes everything a lot simpler when using the integrated BIM and being at least partly automatically completed by software modules that can access the data of the structure data model.

It has already been proposed in this context to include data relating to the operation of a crane in a BIM or in a structure data model. Document WO 2016/019158 A1, for example, describes a method by means of which a BIM is updated by crane operating data, a timeline or a timetable being generated using the construction elements to be moved by the crane that includes the required crane deployments and is integrated in the data model of the BIM. The BIM model can then update further BIM functions with reference to the generated timeline.

Document WO 2013/006625 A1 further describes a method of maneuvering a crane within a construction site while making use of data from a BIM model, with, on the one hand, global 3D coordinates of the crane hook that are determined with the aid of absolute position sensors and, on the other hand, global 3D coordinates that characterize the structure to be erected and the position of the structure parts and are stored in the BIM being compared with one another.

As a result, the functional gain of the previously provided linking of a crane to the BIM is, however, limited. To date, it has in particular not been possible to achieve any great advantages in the control of construction machinery such as cranes or excavators and their handling by BIM models. In addition, real time problems that may arise on the use of BIM data for the crane control due to limited data transmission speeds and data transmission bandwidths, in particular in time-sensitive control work such as oscillation damping, have been unsatisfactorily solved.

It is therefore the underlying object of the present invention to provide an improved integration of construction machinery and their operation in structure data models and/or an improved link of construction machinery to such structure data models that avoid disadvantages of the prior art and advantageously further develop the latter. A more efficient and more secure control of construction machinery should in particular be achieved by an improved link to BIM models.

SUMMARY OF THE INVENTION

According to an exemplary embodiment of the invention, the present invention is a crane or an excavator, having a construction machine control apparatus for controlling pieces of working equipment of the construction machine, characterized by a data communication device connected to a master construction site computer for receiving and processing digital information from a structure data model to which the master construction site computer has access, and by a control configuration module for influencing at least one control function of the construction machine control apparatus in dependence on the received digital information from the structure data model.

In accordance with an aspect of the invention, it is therefore proposed to link the control of a construction machine used on the construction site to a master construction site computer that has access to the structure data model or BIM so that the construction machine control apparatus, for example the crane control, can exchange data with the structure data model. In accordance with the invention, the construction machine has a data exchange module connectable to the master construction site computer for the exchange of data with the master construction site computer, with the data exchange module having reading and/or writing means for reading and/or writing access to the master construction site computer. It is in particular possible to intervene in the control of the construction machine with reference to digital information from the structure data model and/or to parameterize and/or modify the control of the construction machine. Alternatively or additionally, the construction machine control apparatus can transmit data to the master construction site computer to update and/or supplement the structure data model and/or generally to transmit digital data of the structure data model and to save them there.

The linking of the control apparatus of the construction machine to the master construction site computer and the structure data model provided by it can generally be utilized for different functions of construction machine operation and of construction site management. The provision of digital data from the structure data model to the control apparatus of the construction machine can in particular be used to carry out different work processes of the construction machine semi-automatically or fully automatically, in particular specific travel processes of the construction machine and/or the movement of construction elements by the construction machine.

The master construction site computer that has access to the structure data model can in particular provide digital location information on a construction element to be installed, in particular where and when a certain component is delivered, where a certain component is located and/or at which position of the structure a respective component is to be installed. If, for example, the control apparatus of a crane accesses such digital information relating the construction element to be installed, certain crane movements and/or lifting movements of the construction element can be carried out in an least partially automated manner.

In a further development of the invention, the control apparatus of the construction machine and/or the master construction site computer can comprise a construction element localization module, for example in the form of a software module, by means of which a construction element to be taken up by the construction machine on the construction site can be localized with reference to digital information from the structure data model. Storage locations or the delivery station and the delivery time can be stored in the BIM or in the structure data model, for example, with the construction machine or the crane together with its load suspension means being able to be traveled at least in a partially automated manner to the storage position or delivery position if the construction element is to be installed in accordance with the timetable that is stored in the BIM. This can, for example, take place such that it is displayed on a display of the construction machine that the next construction element to be worked is located at a certain position and the machine operator is asked in a dialog box whether the position should be traveled to automatically, which can then be carried out if the machine operator confirms it. The performance can optionally also take place fully automatically.

In an advantageous further development of the invention, the taking up of a construction element can also take place in an automated manner or can be supported by the construction site computer. A detection apparatus can in particular be provided for detecting a construction element located in the taking up and/or working region of the construction machine, with the detection apparatus, for example, being able to have a camera and/or an imaging sensor and/or a barcode scanner and/or an RFID reader to be able to identify the construction element located in the proximity of the lifting hook of a crane, for example. If the detection apparatus recognizes a certain construction element, for example with reference to a barcode applied thereto or with reference to an RFID signal emitted thereby, the construction machine control apparatus can determine with reference to digital data from the structure data model that are provided by the construction site computer whether it is the "correct" construction element for the next work step and/or the section or point of the structure to be erected at which the construction element is to be positioned or placed down.

Alternatively or additionally to the RFID recognition, work can also be carried out with an LWID, i.e. in the identification system working in the low frequency or low wave range. Work can in particular also be carried out with a so-called RuBee recognition system, with such a RuBee system communicating bidirectionally on demand, with work being able to be carried out, for example, in a frequency range of an order of magnitude of 100-150 kHz, but optionally also higher or up to 450 kHz. Such RuBee tags can comprise a microprocessor having a memory module and can use an IP address. The RuBee recognition can in particular also use magnetic waves and/or can communicate inductively, with the RuBee recognition in particular being characterized by its robustness with respect to interference due to metal parts and moisture and thus being particularly suitable for construction machine deployment or crane deployment.

In an advantageous further development of the invention, the control of the construction machine can also have a hoist control module for the automated hoist control with reference to relevant information from the structure data model. The hoist control module can here work semi-automatically or fully automatically to carry out a lift in an automated manner in interaction with an input or release or with confirmation commands of the machine operator or optionally also without such complementary control commands. The machine operator can identify the construction element to be moved by the construction machine in a semi-automatic manner for this purpose. Alternatively, an automated construction element recognition can also take place as previously explained in order, for example, to identify a load to be suspended at the lifting hook of a crane.

It is then possible to determine for a detected and/or identified construction element via the link of the construction machine control apparatus to the master construction site computer with reference to the structure data model and to relevant digital information the location of the structure to which the construction element is to be moved, with in particular position data for the respective construction element from the structure data model being able to be used for this purpose.

The hoist control module can calculate the travel path for the automated hoist, optionally while taking account of further topographical data of the construction site such as access roads et cetera, from the data of the BIM provided by the master construction site computer and relating to the identified construction element and optionally further structure characteristics such as structure contours.

Alternatively or additionally to such an automated traveling of the construction machine by the hoist control module, a blocking module can also be provided that can block a corresponding hoist or a corresponding work step of the construction machine in interaction with the structure data model, in particular, for example, when a corresponding construction element has been installed or when a connecting module required for the installation of the construction element has not yet been installed.

The blocking module can in particular work in interaction with the aforementioned construction progress monitoring, in particular such that a determination is made with reference to the previously explained desired/actual comparison of the construction progress whether the structure is ready to move the respective construction element accordingly. Unnecessary lifts with construction elements can hereby be avoided that cannot yet be installed or whose installed position is not yet ready.

The blocking module and/or the aforementioned hoist control module can be integrated in the machine control apparatus and/or can be downloadable and/or importable as a software tool, for example from the master construction site computer, or can also be linked to the machine control apparatus in the form of a stored, separate module. The blocking module and/or the hoist control module can advantageously be parameterized and/or modified by means of digital information from the structure data model.

To travel a construction element at least partially in an automated manner, i.e. to be able to pick it up at a specific point and to place it down at a specific point, the construction machine control apparatus or the aforementioned hoist control module can advantageously process at least three-dimensional coordinates and can obtain them from the construction site computer, with the position coordinates of the load pick-up location provided by the master construction site computer being able to be X1, Y1, and Z1, for example, and with the position coordinates of the unloading point being able to be X2, Y2, and Z2, for example, that is, can advantageously comprise respective elevation coordinates X and Y and vertical coordinates Z. The XYZ coordinate system can, for example, be a coordinate system that is fixed with respect to the construction site or the structure, i.e. with respect to the structure to be erected, and that always indicates the loading and unloading positions relative to the structure to be erected. The XYZ coordinates can, for example, be accessed from or provided by the structure data model.

The loading and unloading positions of the respective construction element are advantageously still defined by at least one further coordinate, namely in particular an angle coordinate or an orientation coordinate $\varphi$, that can in particular indicate the angle of rotation or the angular orientation of the construction element with respect to an upright axis. If a crane is used as the construction machine to move the construction element from the delivery location to the installed location, the crane can advantageously have a rotary device for rotating the lifting hook about an upright axis. This can, for example, take place by a rotary drive that is directly associated with the lifting hook itself, for example to rotate the lifting hook with respect to the block tackle. Alternatively or additionally, the trolley travelable at a crane boom can also be correspondingly rotated by a rotary trolley drive to be able to pick up and put down the construction element in different angular orientations.

Depending on the delivery station or on the goods buffer store, the angular orientation on the picking up of the load can be predefined and known, for example read from the structure data model, when the orientation is stored there. Alternatively or additionally, the crane or the construction machine can also be provided with a detection device for detecting the angular orientation, for example with a camera by means of which, for example, the orientation of a fabricated wall or of a steel beam can be determined. The angular orientation $\varphi 1$ determined on the picking up of the construction element can then be converted by rotating the lifting hook or the trolley into the desired angular orientation $\varphi 2$ at the installed location, with the required construction element orientation at the installation location being able to be read from the structure data model and/or being able to be determined, for example again by means of a camera, by detection of the orientation of the already installed connection construction elements.

In addition to the one angle coordinate $\varphi$ that determines the angular orientation with respect to a vertical axis of rotation, further angular orientation coordinates can optionally be used, for example when a construction element such as a long beam is to be lifted together by means of two cranes and is, for example, to be placed down in an orientation that is not exactly horizontal.

To enable a fine adjustment of the position of the construction machine or of its load suspension means and/or of the construction element suspended thereon in a simple and favorable manner, the construction machine control apparatus can have a travel control module that has at least one operating element that has actuating axes whose orientation corresponds to the desired travel axes such that a movement of the operating element in a specific direction effects a travel of the construction machine or of the load suspension means in the corresponding direction and/or effects a rotation of the operating element about an axis of rotation of the load suspension means about an axis of rotation in parallel therewith in a corresponding direction. The operating element can be a joystick, for example, that is tiltable in different axes to generate travel movements in the corresponding directions and/or is rotatable to enable a rotation of the construction element such as has previously been described. Alternatively or additionally, slide buttons and/or push buttons and/or a touchscreen on which finger movements in certain directions or rotations can be detected can be used as the operating element.

This travel control module or its at least one operating element is advantageously not provided in the machine operator's cab—where corresponding travel control means can naturally also be provided—but rather in direct proximity to the load suspension means of the construction machine, for example directly at the lifting hook or at the deflection pulley of a crane supporting the lifting hook. For example, respective push buttons can be provided at its four sides at the lifting hook or at a structural part connected thereto that trigger a travel movement in the direction of the push movement on their pushing, whereby an intuitive fine adjustment of the alignment or position of the lifting hook is made possible. Alternatively or additionally, a rotational control button can be provided which is rotatable about an upright axis and by means of which the lifting hook or the trolley can be rotated about the upright axis to be able to set the aforementioned direction angle φ.

Alternatively or additionally to such a fine adjustment position control module directly at the load suspension means, the travel control module can also be implemented in the form of a mobile control unit, for example in the form of a tablet, that a machine operator present at the load suspension means can take along with him. The orientation of the control axes defined at the tablet can be very simply brought into agreement with the movement axes of the construction machine, for example, in that the machine operator himself or the tablet moves into a predefined orientation with the construction machine, for example moves with his back to the crane tower beneath its boom and/or the tablet moves in a specific orientation to the boom of the crane and/or he or the table moves in a specific orientation with the structure that is to be erected and whose orientation is naturally known to the structure data model.

Alternatively or additionally, a corresponding travel control apparatus and/or orientation control apparatus can also be attached to the construction element to be traveled whose position and orientation should ultimately be controlled. For example, a corresponding control tablet can be positioned for fine adjustment at a marked installation point at the construction element to be able to carry out the fine adjustment or fine positioning in the named manner.

By an attachment that is, for example, temporary of the travel control module to the construction element to be adjusted and/or to the load receiving means receiving the construction element in a predefined orientation thereto, which can take place, for example, by a holder at the construction element and/or load receiving means and/or a mark attached thereto, it is simultaneously possible to link the orientation axes of the operating element of the travel control module in a suitable manner with the movement axes of the construction machine since the temporary attachment in a predefined orientation defines the movement axes of the operating element and enables an intuitive operation. If, for example, a tablet is positioned in a predefined orientation at a main surface of a fabricated wall, the crane control recognizes the alignment of the wall from the structure data model and/or by means of a suitable sensor system so that the pressing of right/left/up/down arrows or a corresponding swiping movement on the tablet can be converted into an adjustment movement of the crane in the desired direction.

Alternatively or additionally, the travel control module or its at least one operating element can be a part of the equipment, in particular a part of a piece of clothing or of an article of the machine operator fastenable to the body in a self-supporting manner, in particular in the form of a so-called wearable electronic module. A glove that is equipped with a corresponding sensor system can in particular be used for the fine adjustment of the position of the load suspension means of the construction machine. Such a glove can, for example, be provided with at least one acceleration sensor and/or direction sensor that can, for example, detect hand movements waving up or down to direct the lifting hook of a crane up or down in the sense of a gesture control. Alternatively or additionally, such a glove can also comprise a piezo sensor that reacts to pressure, for example such that the lifting hook is pressed away on a pressing with an outer surface of the glove and the lifting hook is pulled in the opposite direction by pressing on an inner hand surface of the glove.

As previously explained with respect to the variant of the tablet, the direction of a pushing command or movement command of the glove can here be detected or determined, for example, in that the glove is placed at a predefined point of the construction element, for example at a front side of the fabricated wall to be moved whose orientation the construction machinery control apparatus is aware of from the BIM or detects by means of a suitable sensor system, for example by means of a camera looking downward from the crane boom. If the control apparatus is aware of the orientation of the construction element or of the load suspension means at which the glove is placed, the control apparatus is also aware of the alignment of the glove.

Alternatively or additionally, it would, however, also be possible to detect the orientation of the glove by means of a suitable sensor system, for example by means of gyroscope sensors and/or compass elements and/or inclinometers and/or GPS modules, etc. to associate specific pressing signals of the sensors integrated in the glove in specific movement directions with the adjustment movement to be produced.

Such a glove can also comprise sensors, for example pressure sensors, with which different movement directions and/or control functions are associated with so that, for example, a different travel movement can be initiated by pressing the sensor attached to an index finger than by the pressing of a palm sensor.

In an advantageous further development of the invention, the travel control module can wirelessly communicate with the control apparatus of the construction machine for the fine positioning of the respective received load, with a radio transmission of the control signals being able to be provided, for example. Alternatively, however, a signal cable transmission of the control signals can also take place, for example via the hoist rope to which the lifting hook of a crane is fastened.

To be able to travel the construction element taken up at the load suspension means of the construction machine gently and free of disturbance to the desired installation position in a semi-automatic or fully automatic manner, an oscillation damping and/or vibration damping can be provided in an advantageous further development of the invention to damp and in the best scenario to fully eliminate unwanted oscillation or vibration movements of the construction element taken up. If the construction machine is a crane, for example, the oscillation damping can prevent an unwanted oscillation of the load suspension means and of the construction element fastened thereto relative to the crane boom. Such oscillation damping apparatus are known in various embodiments for cranes, for example by controlling the slewing gear drive, the luffing drive, and the trolley drive in dependence on specific sensor signals, for example inclination signals and/or gyroscope signals. Documents DE 20 2008 018 260 U1 or DE 10 2009 032 270 A1, for example, show known load oscillation damping devices at cranes and their subject matters are expressly referenced to this extent, that is, with respect to the principles of the oscillation damping device.

To enable an automated picking up of a load at the load suspension means of the construction machine, in particular at the lifting hook of a crane, the load suspension means can be configured in a special manner, and can in particular have a coupling device and/or a locking device that is automated or actuable by outside energy. Alternatively or additionally to such a coupling device, the load suspension means and/or a mounting piece attached to the construction element to be picked up can have centering means for centering the load suspension means relative to the counter-piece attached to the construction element, for example in the form of a conical mount recess and a cone-shaped counter-piece cooperating therewith.

Alternatively or additionally, the automatic picking up of the load can also be assisted or implemented by an abutment that can be traveled to and that facilitates the traveling to and location of the coupling position or mounting position.

The load suspension means can in particular comprise at least one lashing element that enables the lashing and releasing of different loads with an associated coupling element fastened to the load or integrated in the load. The lashing element can advantageously be automatically fastened and/or released by the construction machine control apparatus or crane control apparatus. A manual fastening and release of the lashing element can advantageously also take place.

An intervention in the construction machine control via its link to the master construction site computer can furthermore comprise the adaptation of a working region boundary implemented there to structure data from the structure data model, with a temporally dynamic adaptation advantageously being able to take place such that the working region boundary can be adapted to resulting construction progresses or can be gradually changed.

Alternatively or additionally to such an automatic adaptation of the working region boundary, a construction progress monitoring can also be provided in which the actual state of the structure and/or its surroundings are detected by means of a suitable detection device such as a camera and/or a scanner and is/are compared with digital information from the structure data model. For the detection of the actual state, structure contours can be detected and/or measured by a camera and/or existing construction elements can be read by means of a barcode scanner and/or can be detected by means of an RFID reader and/or position data of construction elements can be determined by means of a localizer, for example in the form of a GPS module or of a radar measurement module.

A determination as to the construction phase the structure is currently in can take place using the comparison of the detected actual data with the associated relevant BIM data. Different assisting and/or automated measures can then be initiated with reference to this determination of the current construction phase by a corresponding construction phase determination module. For example, which work steps are to be carried out next and/or where a construction element delivered to the delivery station is to be moved in accordance with its intended purpose can be displayed at a display apparatus of the construction machine. For example, a virtual representation of the structure in its respective state can be generated on a display unit in the operator's cab with reference to imported information from the structure data model, in which virtual representation the construction element currently to be traveled or moved and its position is displayed so that, for example, a crane operator can see what lift is to be made and where a construction element to be suspended at the hook is to be moved.

Characteristics of the available construction machinery can already be taken into account in the planning and in the selection of a suitable construction machine, for example a crane of the matching payload category, by linking the construction machine or a machine data model which relates to the construction machine and in which digital information on different construction machine models is included to the structure data model or to the BIM. The machine data model can here be provided in the form of a software module or an app that has an interface for communication with the structure data model and that can, for example, be downloaded from a server or from a software store or that can also be stored on a data carrier.

An automatic selection of a construction machine suitable for the erection and/or working of the respective structure can advantageously take place by means of the machine data model with reference to digital information from the structure data model and from the machine data model, with an automatic identification and reading of relevant information from the structure data model being able to take place for this purpose with reference to criteria that are predefined by the machine data model and that relate to machine data in which the different construction machine models differ from one another. The automatic selection of the suitable construction machine then takes place with reference to an automatic comparison of the read information from the structure data model with the machine data of different construction machinery from the machine data model.

The modules implementing the functions can in particular be integrated in the form of software tools in the machine data model, but optionally also in the structure data module. On an integration into the linkable machine data model, the total functionality for the automatic selection of the matching construction machine can be provided by the downloadable and/or importable software tool that implements the machine data model and it is possible to this extent to work with a BIM or with a structure data model that for this purpose only requires a corresponding interface via which the supplementary software tool can be linked.

The relevant information from the structure data model that is required for the selection of the construction machine and that is identified and read by an identification and/or reading module can comprise different structure characteristics such as the structure height, the weight of the heaviest construction element to be moved, the area and/or the cross-sectional extent of the structure in elevation and/or the maximum distance between a construction element delivery station stored in the BIM and a construction element destination at which the respective construction element is to be installed. These identified and read structure characteristics can then be compared by comparison module with relevant information from the machine data model, with the relevant machine information in particular being able to comprise the following information: machine lift height; maximum machine payload; and/or machine range. If, for example, a crane suitable for the structure is to be selected, a crane can be selected whose lift height is sufficient for the structure height whose payload is sufficient for the weight of the heaviest construction element to be moved and whose range is sufficient for the cross-sectional extent of the structure in elevation and/or the maximum distance between the construction element delivery station and the construction element destination. If more than one crane is included in the machine data model that satisfy the criteria, the smallest crane can be selected that satisfies the demands and so-to-say has the smallest surplus with respect to the crane capacities.

In accordance with a further aspect of the present invention, the linking of the machine data model to the structure data model can also be utilized to determine and/or to automatically check the installation site of the construction machine, in particular the position of the crane relative to the structure to be erected or to be worked. If a construction machine is selected, which can take place in the aforementioned manner in an automated fashion by the described selection module or alternatively also manually by the planner himself, a position determination module can automatically determine a suitable installation location for the construction machine with reference to relevant machine data that are read from the construction machine model and that can, for example, comprise the range and/or the lift height and/or the collision range and/or working range of the construction machine and with reference to relevant structure data that are read from the structure data model and can, for example, comprise structure dimensions and/or structure contours and/or construction site topographical data and/or access paths and/or material delivery stations. Alternatively or additionally, the position or installation location determination module can check a position of the construction machinery possibly manually fixed by the planner with respect to the criteria, in particular as to whether the range or the working location of the construction machine at the determined installation location is sufficient for the work to be carried out by the construction machine and/or whether collisions of the working range of the construction machine with structure contours and/or other topographic circumstances of the construction site such as trees or adjacent buildings occur in order then optionally to release the installation location of the construction machine or to propose an alternative installation location.

After a successful determination and/or check of the machine installation location, the BIM or the structure data model can be correspondingly updated by the installation location determination module with respect to the installation location.

In a further development of the invention, the installation location determination module can also automatically bound the working range of the respective selected construction machine automatically with reference to aforementioned collision check and can update the structure data model by the determined working range restrictions. As will still be explained, the construction machine control apparatus can be adapted or parameterized accordingly with respect to a working range boundary function.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

DETAIL DESCRIPTION OF THE INVENTION

Figure 1:
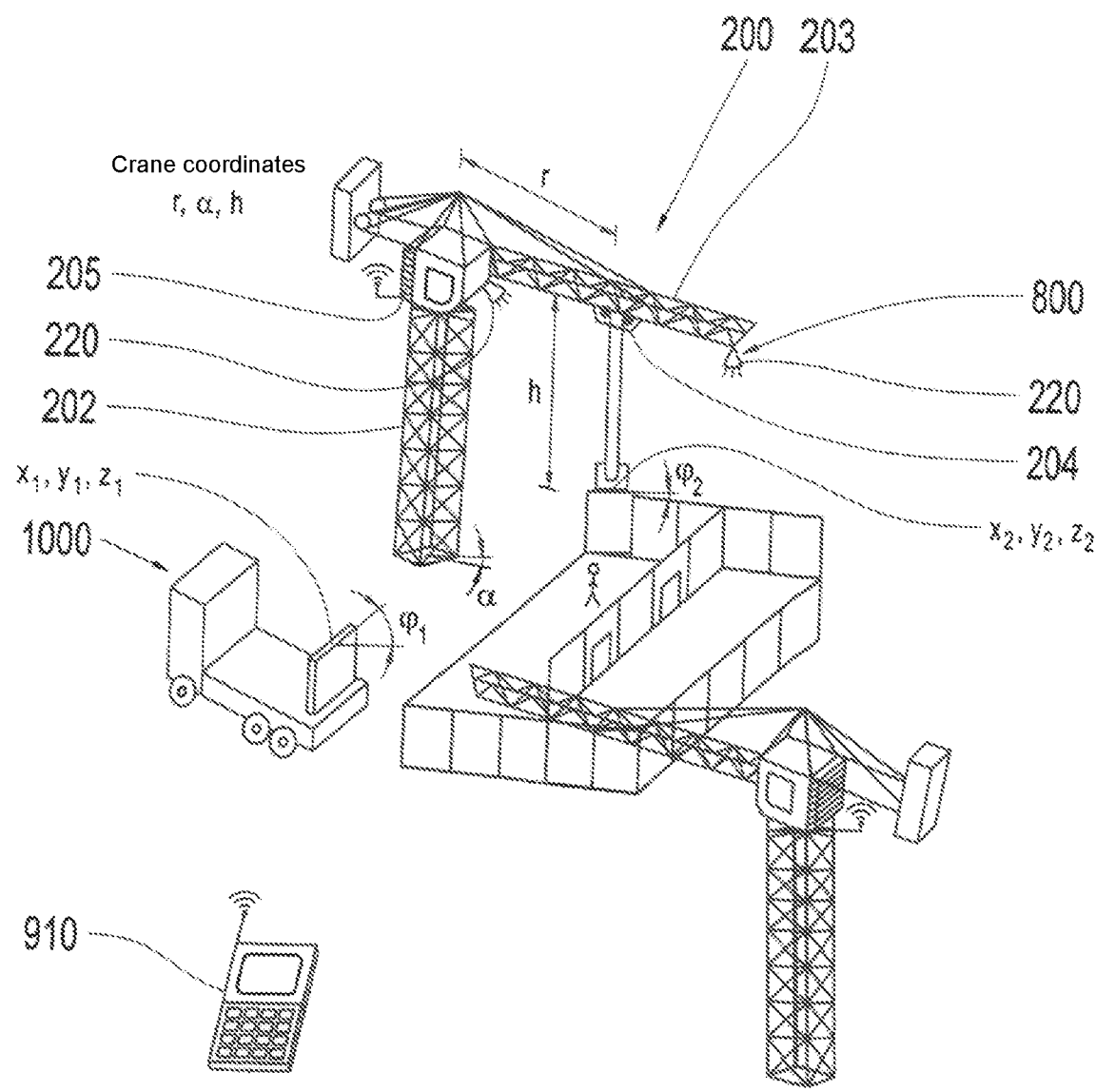
FIG. 1 is a schematic representation of a construction machine in the form of a crane whose control is linked to a master construction site computer that has access to a structure data model and maneuvers a load in an automated manner from a delivering truck to an installation position at the building to be erected.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

As FIG. 1 shows, a crane 200 that is linked in a manner still to be explained to a structure data model 300 can be configured as a revolving tower crane whose tower 202 supports a boom 203 at which a trolley 204 is travelably supported. The boom 203 can be rotated about an upright axis together with the tower 202 or also without the tower 202—depending on the configuration of the crane as a top slewer or as a bottom slewer—for which purpose a slewing gear drive is provided in a manner known per se. The boom 203 could optionally also be configured as being able to be luffed up and down about a horizontal transverse axis, with a suitable luffing drive being able to be provided, for example, in interaction with the boom guying. The trolley 204 can be traveled in a manner likewise known per se by means of a trolley traveling winch or of another trolley travel drive.

Instead of the crane 200 shown, however, a different crane could also be used, for example in the form of a telescopic boom crane or also a construction machine of a different type such as an excavator, and could be linked to the BIM or to the structure data model 300.

Figure 2:
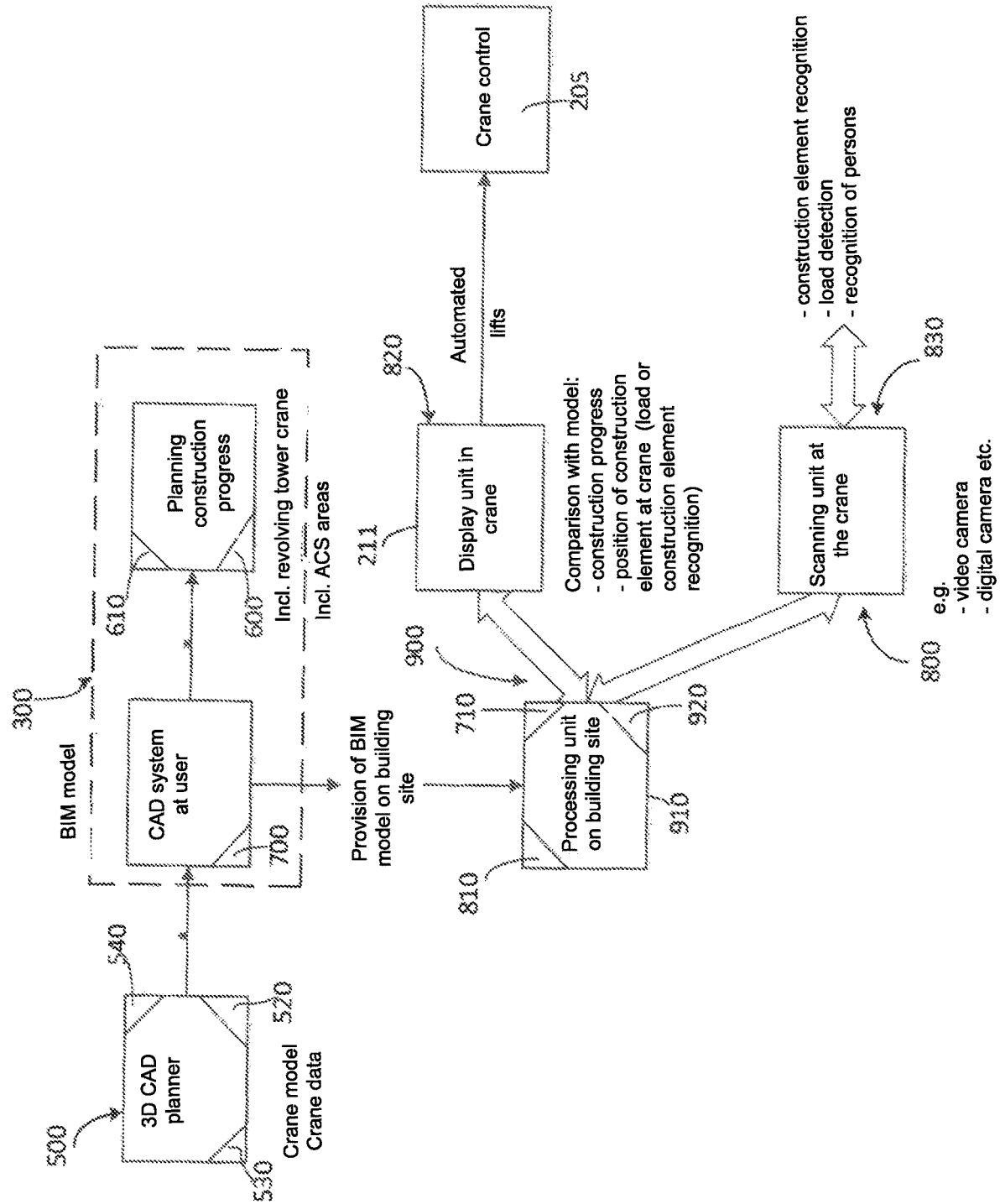
FIG. 2 is a schematic structural representation of the link of the control of the crane of FIG. 1 to the structure data model via the master construction site computer and of the link of a machine data model that includes characteristics of the crane to the structure data model to assist the construction planning.

As FIG. 2 shows, the crane 200 can already be taken into account in the planning phase. For this purpose, a construction machine model 500 that can include in the manner digital information on different construction machinery, in particular on different cranes, including the crane 200 of FIG. 1, can be linked to the structure data model 300. The construction machine model 500 can be provided in the form of a downloadable software tool or software module that has an interface that permits the construction machine model 500 to be linked to the structure data model 300 so that the two can communicate and exchange data with one another.

The planning process can be simplified with the aid of the link of the machine data model 500. The selection of the crane, the positioning of the crane relative to the structure to be erected, and the working ranges of the crane 200 can in particular be carried out or determined in the manner initially explained in more detail. For this purpose, suitable software modules and/or hardware modules, in particular a machine selection module 520, an installation location determination module 530, a collision determination module 700, and a working range setting module 710, can be integrated into the construction machine model 500 and/or into the structure data model 300.

As FIG. 2 shows, the crane 200 is also itself linked to the structure data model 300, and indeed via a master construction site computer 901 that has access to the structure data mode. To provide the BIM or the structure data model 300 on the construction site, the master construction site computer 910 that can be positioned on the construction site or in the range of the structure to be erected can be linked to a server on which the BIM or the structure data model 300 is provided. A local copy of the BIM or of the structure data model 300 can advantageously be stored on the master construction site computer and can be cyclically or continuously synchronized with the original version of the structure data model 300. Long data paths and a time offset can hereby be reduced and an interaction free of time offset or with a low time offset can be implemented between the structure data model 300 and the crane 200 since the crane control apparatus 205 can directly access the master construction site computer 910 and the local copy of the structure data model 300 there without a remote data transmission to a remote, central BIM server with possible bandwidth restrictions being necessary. The latter would naturally nevertheless be possible.

If data from the crane 200 or from its control apparatus 205 are written into the structure data model 300, they can first be buffered in the master construction site computer 910, with then the versions of the structure data model 300 there being able to be correspondingly updated by synchronization of the master construction site computer 910 with a central server and/or computer units and server units of other participants such as a planning office or a machine lender.

Different crane functions or generally control functions of the corresponding construction machine can be adapted or parameterized in dependence on digital data from the structure data model 300 due to the link of the crane 200 to the master construction site computer 910 or to the structure data model 300 provided thereby. Corresponding digital information from the structure data model 300 can be sent to the crane 200 for this purpose by means of the data communication device 900 shown in FIG. 2. The data communication device 900 in particular connects the construction site computer 910 to the control apparatus 205 of the crane 200.

A control configuration module 902 that can be implemented in the control apparatus 205 of the crane 200, but that can also be provided in the construction site computer 910, is provided to correspondingly adapt the control functions to the control apparatus 205 of the crane 200. This control configuration module 920 can in particular adapt the working range boundary function of the crane 200, that can be implemented in its control apparatus 205, to different construction phases, and accordingly to growing structure walls and obstacles by means of digital data from the structure data model 300.

Independently of such an adaptation of the working range boundary, the link of the crane to the master construction site computer 910 and to the structure data model 300 provided by it can implement an automated construction phase monitoring. For this purpose, on the one hand, the actual state of the structure can be determined by means of a suitable detection device 800, with the detection device 800 generally being able to be configured differently. For example, the detection device 800 can comprise at least one camera and/or a suitable imaging sensor, for example in the form of a camera 220 installed at the crane 200. An image processing device arranged downstream of the generated images can detect specific characteristics, for example structure height, developed ground plan surface, outline contours or similar, that characterize the construction progress. Alternatively or additionally to such cameras or imaging sensors, other detection means can also be provided such as a scanner or an RFID reader to detect whether certain construction elements are already installed at the structure or not. Such a scanner or RFID reader can, for example, be attached to the crane hook 208 or can also be used in the form of a mobile unit by means of which installed components can be manually scanned.

The actual state of the structure detected by the detection device 800 is then compared with digital information from the structure data model 300 by a construction phase determination module 801 that can, for example, be implemented in the construction site computer 910 to determine the respective construction phase from the comparison.

The crane 200 can carry out different functions on the basis of the determined construction phase. It is, for example, already helpful if the respective reached construction phase is displayed on a display apparatus at the crane 200, either in its crane operator's cab 206 or at the control station 2 of the remote control device.

However, further control functions can also be adapted at the crane 200 with the aid of a control configuration module 902 that can be implemented in the construction site computer 910, but in particular also in the control apparatus 205 of the crane 200. For example, a virtual representation of the respective work task to be carried out next by the construction machine can be displayed at the display unit at the crane or at its remote control apparatus, for example such that the respective next construction element to be installed and its installed position at the structure are superposed in the virtual representation of the structure in its respective construction phase. Alternatively or additionally, a travel path can also be superposed in the representation.

In an even more advantageous manner, automated lifts can also be carried out by the crane 200, in particular on the basis of the aforementioned construction phase monitoring and the accompanying determination of the next work step.

If, for example, a construction element is delivered to the construction site by means of a truck 1000, which can, for example, be seen from the structure data model 300 or its timetable by a corresponding input, the master construction site computer 910 can advise the control apparatus 205 of the crane 200, in particular also of the unloading position at which the truck 1000 stops in accordance with its intended purpose to unload the construction element. FIG. 1 in this respect shows the coordinates X1, Y1, and Z1 that indicate the position of the construction element at the unloading location of the truck 1000. The angle φ1 shown in FIG. 1 additionally determines the angular orientation of the construction element relative to the structure to be erected, which can, for example, be predefined in a simple manner in that the truck has to adopt a predetermined unloading position that the BIM 300 is aware of and the construction element is supported in a specific orientation on the truck 1000. Alternatively or additionally, a suitable detection device can be provided, for example in the form of a camera 220 that can, for example, be attached to the boom 203 of the crane 200 and that can look downwardly to thus be able to determine the orientation of the construction element by means of an image evaluation unit.

If the master construction site computer 910 advises the control apparatus 205 of the crane 200 of the delivery, the control apparatus 205 can travel the crane 200 so that its lifting hook is moved to the truck 1000 and to the construction element located thereon.

The lifting hook of the crane 200 can advantageously have independent coupling means, for example such that the lifting hook is traveled against an abutment at which a load pick-up at the construction element couples with the lifting hook, as will be explained in more detail later. Alternatively or additionally, the fine adjustment of the lifting hook relative to the construction element to be picked up can also take place in the manner initially already explained in more detail by a travel control module 990 that is located at the lifting hook and that can actuate a position at the truck 1000 or at its load surface that is responsible for the coupling procedure when the lifting hook 200 has traveled to the position X1, Y1, Z1, φ1 in an automated manner.

Detection means at the lifting hook can here also check whether the construction element located at the truck is actually the construction element to be installed, in which, for example, an RFID code, a barcode, or similar is read, as initially already explained in more detail.

For this purpose, a detection device 830 can be provided by means of which a construction element located in the pick-up region or working range of the crane 200 can be detected, in particular as to whether it is the construction element that should be installed in the next work step. The detection apparatus 830 can, for example, comprise a barcode scanner or an RFID reader that can be attached to the crane hook. It is, however, understood that different detection means can also be used to identify the construction element to be picked up.

If it is found in this manner that the construction element to be installed in the next work step has been suspended at the crane hook 208, the control configuration module 920 can cause the crane control apparatus 205 to carry out an automated lift on the basis of the digital information from the structure data model 300 to move the component to the installed location in accordance with its intended purpose, in particular to the installed position X2, Y2, Z2, with the angular orientation of φ2 required there. The crane 200 can be rotated for this purpose and its trolley can be traveled and likewise rotated.

Figure 3:
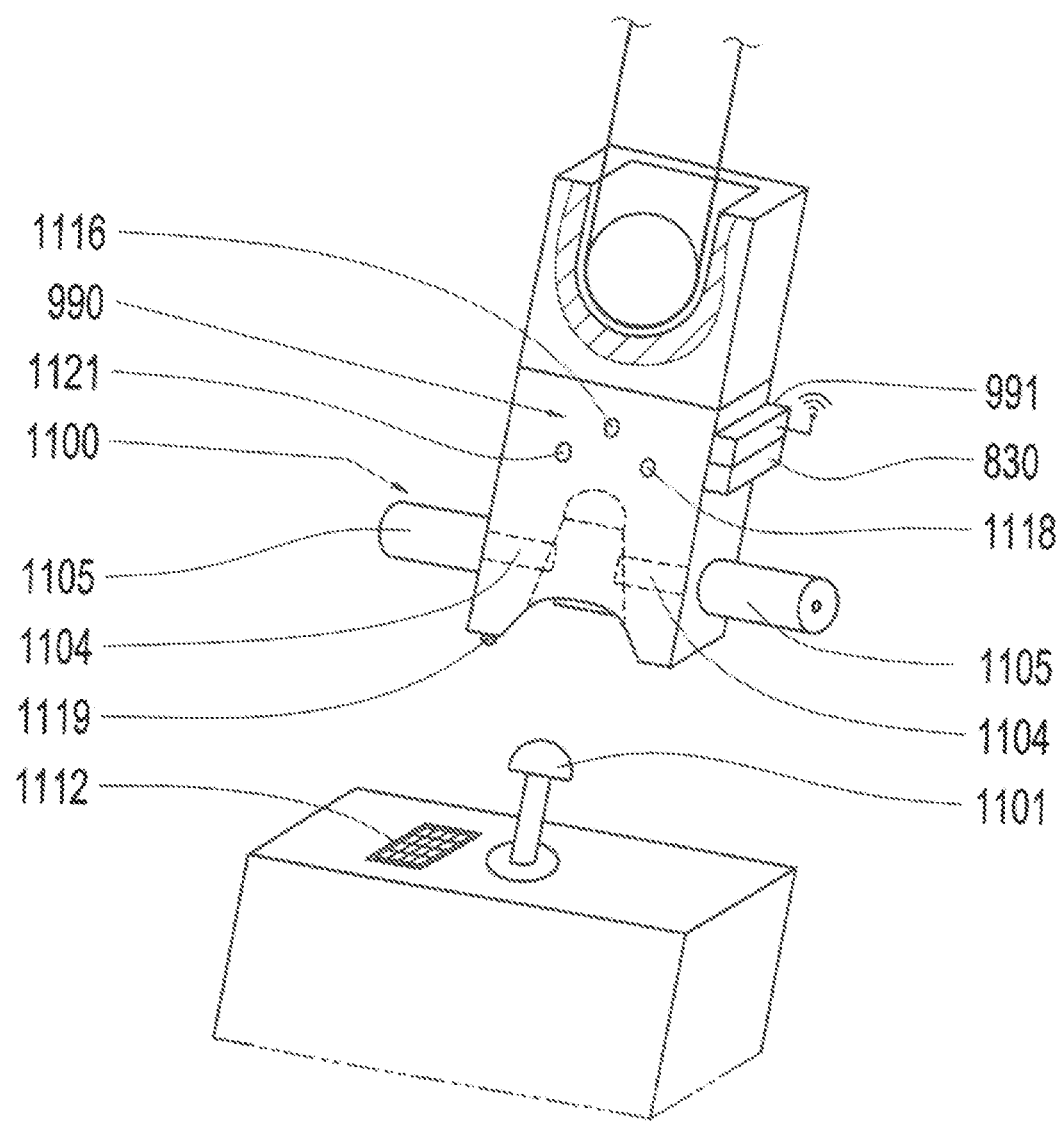
FIG. 3 is a schematic perspective representation of a load suspension means of the crane of FIG. 1 for picking up a construction element by means of a coupling, with the coupling part at the lifting hook side and the coupling part at the construction element side being shown in a not yet coupled approach position.

FIG. 3 shows by way of example a load suspension means 1100 of the crane 200 that enables an automatic coupling of the load. The load suspension means 1100 can, for example, be configured in the form of a shape-matched coupling that can engage in a shape-matched manner a matching gripping element 1101 at the construction element, for example a gripping head in the form of a mushroom head. As FIG. 3 shows, actuators for actuating, in particular opening and/or closing, can be associated with the coupling elements, for example in the form of slides 1104, with the actuators 1105 being able to be actuated by external energy actuation, for example from the crane control; on the other hand, they can, however, advantageously also be manually actuated.

The load suspension means 1100 can have a sensor system 1119 for the fine positioning by means of which marking elements 1112 attached to the construction element can be detected. The detection means 1119, together with the markings 1112 at the construction element, can achieve a fully automated fine traveling to the coupling position or to the load pick-up position.

Alternatively or additionally, however, work can also be carried out in the initially already explained manner by the travel control module 990 at the lifting hook or at the load suspension means 1100 to travel the load suspension means 1100 exactly into the desired position and orientation. FIG. 3 indicates some operating elements 1116, 1118, and 1121 by means of which movements of lifting hooks or load suspension means can be finely adjusted in the initially already explained manner. The operating elements 1116, 1118, and 1121 can, for example, be push buttons, slides, or rotary knobs whose movement axes predefine corresponding crane hook adjustment movements and their directions. As FIG. 3 shows, the travel control module 990 can have a transmission and/or reception unit 991 to communicate with the control apparatus 205 of the crane.

Figure 4:
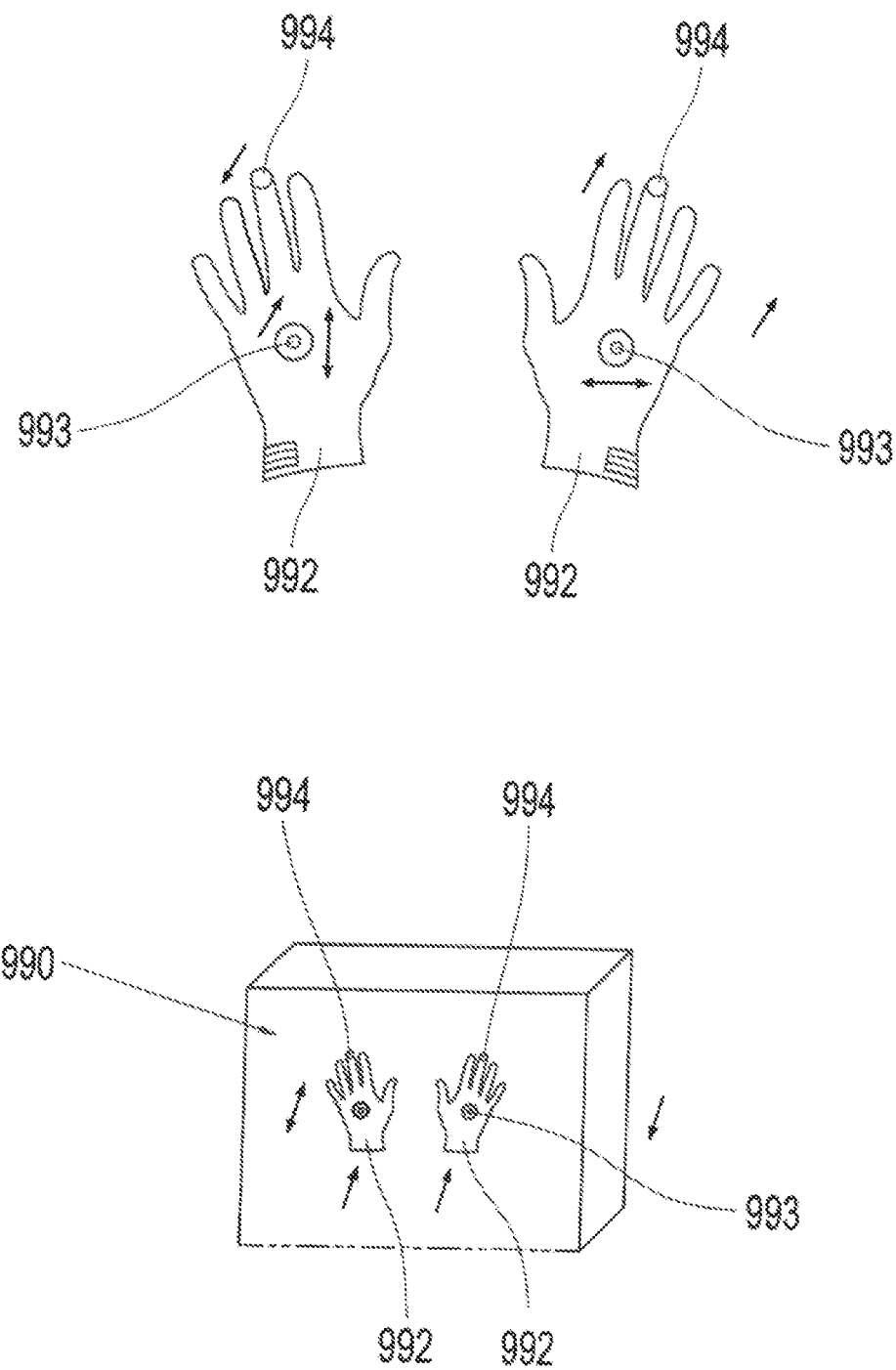
FIG. 4 is a schematic representation of an electronic fine control module in the form of an electronic wearable module configured as a glove for the fine direction of lifting hook movements of the crane of FIG. 1 by manual pressing at the construction element to be traveled.

As FIG. 4 shows, the travel control module 990 can also comprise operating elements that are integrated in gloves of a machine operator. Such gloves 992 can, for example, comprise pressure-sensitive and/or direction-sensitive sensors 993 and 994 that can be integrated in fingertips and in the palm of the respective glove 992.

If surfaces of the construction element to be traveled and/or surfaces of the load suspension means 1100 are touched by the gloves 992, the direction in which the gloves 992 push, pull or rotate at the construction element or load suspension means can be detected by means of the sensors 993 and 994 to then carry out corresponding travel movements via the control apparatus 205 of the crane. Surface parts that cooperate with the gloves 992 and that can better detect the direction of pressure and/or the direction of movement together with the sensors 992 and 993 and 994 can optionally be attached to the load suspension means 1100 and/or at the construction element to be traveled. Alternatively or additionally, a position marking can also be attached to the construction element to be traveled and predefines the contact position or gripping position of the gloves 992 so that the control apparatus knows—from the construction element orientation—the direction in which the gloves 992 and their sensors 993 and 994 work.

Different functions can in particular also be associated with the different sensors 993 and 994 of the gloves 992. As FIG. 4 shows, the function "Travel horizontally from right to left" can be associated with the palm sensor 992 of the right glove, for example, while the function "Travel vertically" can be associated with the palm sensor 992 of the left glove. To be able to control a travel perpendicular to the contact plane—corresponding to the plane of the drawing of FIGS. 4—the finger sensor 994 of the left glove can, for example, signal an approach to the operator and the finger sensor 994 of the right glove 992 can signal a traveling away. Other assignments of the sensors are naturally possible.

As FIG. 2 indicates, other recognition functions can also be implemented by means of suitable scanning units or detection apparatus, for example a person recognition, in particular as to whether persons are located in the intended load travel path of an automated lift.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

I claim:

1. A construction machine having a construction machine control apparatus for controlling working equipment of the construction machine comprising:
   a travel control module having one or more operating elements with actuation axes for controlling travel axes of the working equipment of the construction machine;
   wherein the travel control module comprises a mobile control unit configured to be positioned in direct proximity to a mobile control unit site and in a predefined mobile control unit orientation;
   wherein the mobile control unit site is selected from the group consisting of a suspended load, a load suspension means for picking up the suspended load, and a combination thereof; and
   wherein the predefined mobile control unit orientation is one in which the actuation axes of the one or more operating elements coincide with the travel axes of the working equipment of the construction machine.

2. The construction machine of claim 1 further comprising temporary attachment means for temporary attachment of the mobile control unit to an attachment surface of the mobile control unit site.

3. The construction machine of claim 2 further comprising:
   a data communication device connected to a master construction site computer and configured to receive and process digital information from a structure data model to which the master construction site computer has access; and
   a control configuration module configured to influence at least one control function of the construction machine control apparatus in dependence on the digital information from the structure data model.

4. The construction machine of claim 3, wherein the control configuration module is further configured to:
   determine an orientation of the attachment surface of the mobile control unit site from the digital information from the structure data model;
   determine an alignment of the actuation axes with the travel axes from the determined orientation of the attachment surface; and
   convert actuation of the one or more operating elements about and/or along the actuation axes into an adjustment movement of the working equipment of the construction machine on the basis of the determined alignment of the actuation axes with the travel axes.

5. The construction machine of claim 4 further comprising a tablet;
   wherein the control configuration module is further configured to:
   determine an orientation of the attachment surface of the mobile control unit site from the digital information from the structure data model; and
   convert a swiping movement on the tablet into an adjustment movement of the working equipment of the construction machine on the basis of the determined orientation of the attachment surface.

6. The construction machine of claim 1 further comprising:
   a data communication device connected to a master construction site computer and configured to receive and process digital information from a structure data model to which the master construction site computer has access; and
   a load suspension means for picking up a suspended load;
   wherein the suspended load is a construction element.

7. The construction machine of claim 6 further comprising:
   a construction element localization module for localizing the construction element to be picked up by the load suspension means with reference to the digital information from the structure data model of the master construction site computer; and
   a travel module for automated traveling of the construction element with reference to position coordinates of the construction element provided by the master construction site computer.

8. The construction machine of claim 6 further comprising a detection apparatus for detecting and/or identifying the construction element located in a pick-up region and/or working range of the construction machine;
   wherein the data communication device is further configured to provide digital information relating to the working of the detected and/or identified construction element in dependence on the detected and/or identified construction element from the structure data model to the construction machine control apparatus; and wherein the control configuration module is further configured to automatically carry out a working step relating to the detected and/or identified construction element on the basis of the digital information from the structure data model.

9. The construction machine of claim 6 further comprising a coupling part that is automatic and/or actuable by external energy and that is automatically releasable and/or closable by the construction machine control apparatus.

10. The construction machine of claim 6, wherein the construction machine control apparatus is configured to automatically travel the construction element from a load pick-up point to an installation point or place-down point using position data from the master construction site computer; and wherein the position data comprise location coordinates in a three-dimensional coordinate system and an angle coordinate that indicates the orientation of the construction element about an upright axis of rotation.

11. The construction machine of claim 6 further comprising a rotational apparatus for rotating the load suspension means of the construction machine about an upright axis of rotation;

wherein the construction machine control apparatus is configured to actuate the rotational apparatus with reference to the digital information from the structure data model.

12. The construction machine of claim 6 further comprising a travel control module that can be positioned at the load suspension means of the construction machine and/or at the construction element and has at least one operating element whose actuation axis coincides with a travel axis of the construction machine.

13. The construction machine of claim 6, wherein the control configuration module is further configured to one or more of:

display a virtual representation of a structure being worked by the construction machine in accordance with a determined actual state and/or a virtual representation of a next work task to be carried out by the construction machine on a display apparatus that is arranged at the construction machine in dependence on the digital information from the structure data model in dependence on a determined construction phase; and display a virtual representation of a next construction element to be worked and an installed position of the next construction element at the structure in dependence on digital data from the structure data model.

14. The construction machine of claim 6, wherein the control configuration module is further configured to change a working range boundary function taken into account by the construction machine control apparatus in dependence on the digital information from the structure data model.

15. The construction machine of claim 6 further comprising:

at least one detection device for detecting an actual state of a structure being worked by the construction machine; and a construction phase determination module for comparing the detected actual state of the structure with digital information from the structure data model and for determining a construction phase in dependence on the comparing;

wherein the data communication device is further configured to provide specific digital information from the structure data model to the construction machine control apparatus in dependence on the determined construction phase.

16. The construction machine of claim 1, wherein the mobile control unit is further configured for temporary attachment to an attachment surface of the mobile control unit site;

wherein the mobile control unit comprises:
a first button selected from the group consisting of a push button and a slide button;
a second button selected from the group consisting of a push button and a slide button; and
a rotatory operating element;

wherein the first button defines a first actuation axis of the actuation axes;

wherein the second button defines a second actuation axis of the actuation axes;

wherein the rotatory operating element defines a rotary actuation axis of the actuation axes;

wherein the first actuation axis and the second actuation axis coincide with two of the travel axes of the working equipment of the construction machine when the mobile control unit is temporarily attached to the attachment surface; and wherein the rotary actuation axis coincides with one rotary actuation axis of the working equipment of the construction machine when the mobile control unit is temporarily attached to the attachment surface.

17. The construction machine of claim 1 further comprising a wearable electronic module configured as a glove comprising sensors;

wherein each sensor of the glove defines one of the actuation axes having different orientations corresponding to different travel axes of the working equipment of the construction machine;

wherein a first sensor of the sensors is configured to command up and down movements of the working equipment along an upright travel axis; and wherein a second sensor of the sensors is configured to command horizontal movements of the working equipment along a horizontal axis.

18. The construction machine of claim 17 further comprising:

a data communication device connected to a master construction site computer and configured to receive and process digital information from a structure data model to which the master construction site computer has access; and a control configuration module configured to influence at least one control function of the construction machine control apparatus in dependence on the digital information from the structure data model;

wherein the control configuration module is further configured to:
determine an orientation of an attachment surface of the mobile control unit site that is temporarily contacted by the glove from the digital information from the structure data model;
determine an alignment of the actuation axes with the travel axes from the determined orientation of the attachment surface; and
convert actuation of one or more of the sensors of the glove about and/or along the actuation axes into an adjustment movement of the working equipment of the construction machine on the basis of the determined alignment of the actuation axes with the travel axes.

19. The construction machine of claim 1 further comprising a wearable electronic module configured as a pair of gloves comprising sensors;
- wherein each sensor of each glove defines one of the actuation axes having different orientations corresponding to different travel axes of the working equipment of the construction machine;
- wherein a first sensor of the sensors is located in a first glove of the pair of gloves and is configured to command up and down movements of the working equipment along an upright travel axis; and
- wherein a second sensor of the sensors is located in a second glove of the pair of gloves and is configured to command horizontal movements of the working equipment along a horizontal axis.

* * * * *